United States Patent
Xie et al.

(10) Patent No.: US 10,331,251 B2
(45) Date of Patent: Jun. 25, 2019

(54) METAL BRIDGE OF TOUCH CONTROL STRUCTURE, TOUCH SCREEN AND ELECTRONIC EQUIPMENT

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xiaodong Xie, Beijing (CN); Ming Hu, Beijing (CN); Jing Wang, Beijing (CN); Ming Zhang, Beijing (CN); Dong Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 131 days.

(21) Appl. No.: 15/537,838

(22) PCT Filed: May 4, 2016

(86) PCT No.: PCT/CN2016/080964
§ 371 (c)(1),
(2) Date: Jun. 19, 2017

(87) PCT Pub. No.: WO2017/143659
PCT Pub. Date: Aug. 31, 2017

(65) Prior Publication Data
US 2018/0136765 A1    May 17, 2018

(30) Foreign Application Priority Data
Feb. 24, 2016   (CN) .......................... 2016 1 0102243

(51) Int. Cl.
G06F 3/041    (2006.01)
G02F 1/1333   (2006.01)
G06F 3/044    (2006.01)

(52) U.S. Cl.
CPC ........ *G06F 3/0412* (2013.01); *G02F 1/13338* (2013.01); *G06F 3/044* (2013.01); *G06F 3/0416* (2013.01); *G06F 2203/04111* (2013.01)

(58) Field of Classification Search
USPC ........................................................ 345/173
See application file for complete search history.

(56) References Cited

U.S. PATENT DOCUMENTS

| | | | | |
|---|---|---|---|---|
| 2011/0148780 A1* | 6/2011 | Lu | ........................... | G06F 3/044 345/173 |
| 2012/0050186 A1* | 3/2012 | Yi | ........................... | G06F 3/044 345/173 |

(Continued)

FOREIGN PATENT DOCUMENTS

| CN | 102830867 A | 12/2012 |
|---|---|---|
| CN | 203812211 U | 9/2014 |

(Continued)

OTHER PUBLICATIONS

International Search Report and Written Opinion in PCT/CN2016/080964 dated Nov. 30, 2016, with English translation.

(Continued)

*Primary Examiner* — Chineyere D Wills-Burns
(74) *Attorney, Agent, or Firm* — Womble Bond Dickinson (US) LLP

(57) ABSTRACT

The embodiments of the present invention provide a metal bridge of a touch control structure, a touch screen and an electronic equipment. The metal bridge includes a bridge body. An orthographic projection of the bridge body on a plane of the touch control structure has a shape of a zigzag line. The metal bridge of the touch control structure pro- (Continued)

vided by the embodiment of the invention applies a bridge body with a zigzag line shape. It is difficult for the human eye to observe the bridge body, and a desired shadow elimination effect is thus provided, thereby improving the display quality of the touch screen.

20 Claims, 2 Drawing Sheets

(56) References Cited

U.S. PATENT DOCUMENTS

| | | | |
|---|---|---|---|
| 2012/0075257 A1* | 3/2012 | Choi | G06F 3/044 |
| | | | 345/176 |
| 2012/0182250 A1* | 7/2012 | Nagata | G06F 3/044 |
| | | | 345/173 |
| 2012/0319990 A1 | 12/2012 | Chan et al. | |
| 2013/0181912 A1* | 7/2013 | Oh | G06F 3/044 |
| | | | 345/173 |
| 2014/0204283 A1* | 7/2014 | Huh | G06F 3/044 |
| | | | 349/12 |
| 2015/0109245 A1* | 4/2015 | Chou | G06F 3/044 |
| | | | 345/174 |
| 2015/0160764 A1* | 6/2015 | Bae | G06F 3/045 |
| | | | 345/174 |
| 2016/0124545 A1 | 5/2016 | Xie et al. | |
| 2016/0259447 A1* | 9/2016 | Lin | G06F 3/044 |
| 2017/0153726 A1* | 6/2017 | Lee | G06F 3/044 |

FOREIGN PATENT DOCUMENTS

| | | |
|---|---|---|
| CN | 104345985 A | 2/2015 |
| WO | WO 201411757 A1 | 8/2014 |
| WO | WO 2014117572 A1 | 8/2014 |

OTHER PUBLICATIONS

Office Action received for Chinese Patent Application No. 201610102243.5, dated Aug. 16, 2018, 14 pages (7 pages of English Translation and 7 pages of Office Action).

International Preliminary Report on Patentability received for PCT Patent Application No. PCT/CN2016/080964, dated Sep. 7, 2018, 11 pages (7 pages of English Translation and 4 pages of Original Document).

Office Action received for Chinese Patent Application No. 201610102243.5, dated Jan. 23, 2018, 13 pages (6 pages of English Translation and 7 pages of Office Action).

* cited by examiner

METAL BRIDGE OF TOUCH CONTROL STRUCTURE, TOUCH SCREEN AND ELECTRONIC EQUIPMENT

RELATED APPLICATIONS

The present application is the U.S. national phase entry of the international application PCT/CN2016/080964, with an international filing date of May 4, 2016, which claims the benefit of Chinese Patent Application No. 201610102243.5, filed on Feb. 24, 2016, the entire disclosures of which are incorporated herein by reference.

TECHNICAL FIELD

The present invention relates to the field of display technology, in particular to a metal bridge of a touch control structure, a touch screen and an electronic equipment.

BACKGROUND

With the development of electronic products, a variety of electronic products, such as mobile phones, tablet PCs (Pad), notebooks, have begun to use touch screen. In these products, OGS (One Glass Solution) touch screen or On-cell touch screen is usually applied.

Either On-cell touch screen or OGS products is likely to use metal bridges. The traditional metal bridge has a straight line shape. In the liquid crystal module (LCM, i.e., LCD Module) design, each display unit (dot) in the RGB design is rectangular. In such a situation, the linear metal bridge is apt to block the RGB display unit, which can be easily detected by the human eye, resulting in the problem of shadow elimination.

SUMMARY

The embodiments of the invention provide a metal bridge of a touch control structure, a touch screen and an electronic equipment, which have a desired shadow elimination effect, thereby improving the display quality of the touch screen.

To this end, an embodiment of the invention provides a metal bridge of a touch control structure. The metal bridge includes a bridge body, and an orthographic projection of the bridge body on a plane of the touch control structure has a shape of a zigzag line.

Optionally, the orthographic projection of the bridge body includes a first segment, a second segment and a third segment, which are connected in series to form the zigzag line. An angle between the first segment and the second segment is an obtuse angle. An angle between the third segment and the second segment is an obtuse angle.

Optionally, the metal bridge further includes two bridge ends located respectively at both ends of the bridge body. A width of the bridge end is greater than a width of the first segment, a width of the second segment and a width of the third segment.

Optionally, the width of the bridge end is greater than 10 μm.

Optionally, a range for a length of the bridge end is 15~30 μm.

Optionally, a range for the angle between the first segment and the second segment is 135°~165°. A range for the angle between the third segment and the second segment is 135°~165°.

Optionally, the angle between the first segment and the second segment is equal to the angle between the third segment and the second segment.

Optionally, a range for the width of the first segment is 5~11 μm, a range for the width of the second segment is 5~11 μm, and a range for the width of the third segment is 5~11 μm.

Optionally, the width of the first segment, the width of the second segment, and the width of the third segment are equal.

Optionally, a range for a length of the first segment is 70~90 μm, a range for a length of the second segment is 70~90 μm, and a range for a length of the third segment is 70~90 μm.

Optionally, the length of the first segment, the length of the second segment, and the length of the third segment are equal.

In another technical solution, an embodiment of the invention provides a touch screen including a display panel and a touch control structure. The touch control structure includes the metal bridge according to any one of the above mentioned embodiments.

The metal bridge of the touch control structure provided by the embodiment of the invention applies a bridge body with a zigzag line shape, therefore, the metal bridge blocking the RGB display units can be avoided to the greatest extent. It is difficult for the human eye to observe the bridge body, and a desired shadow elimination effect is thus provided, thereby improving the display quality of the touch screen.

In the touch screen provided by the embodiment of the invention, the above mentioned metal bridge is applied. A desired shadow elimination effect is thus provided, thereby improving the display quality of the touch screen.

DETAILED DESCRIPTION OF THE INVENTION

In the following, the implementations for the metal bridge of the touch control structure, the touch screen and the electronic equipment provided by the embodiments of the invention will be described clearly and completely in connection with the drawings.

Figure 1:
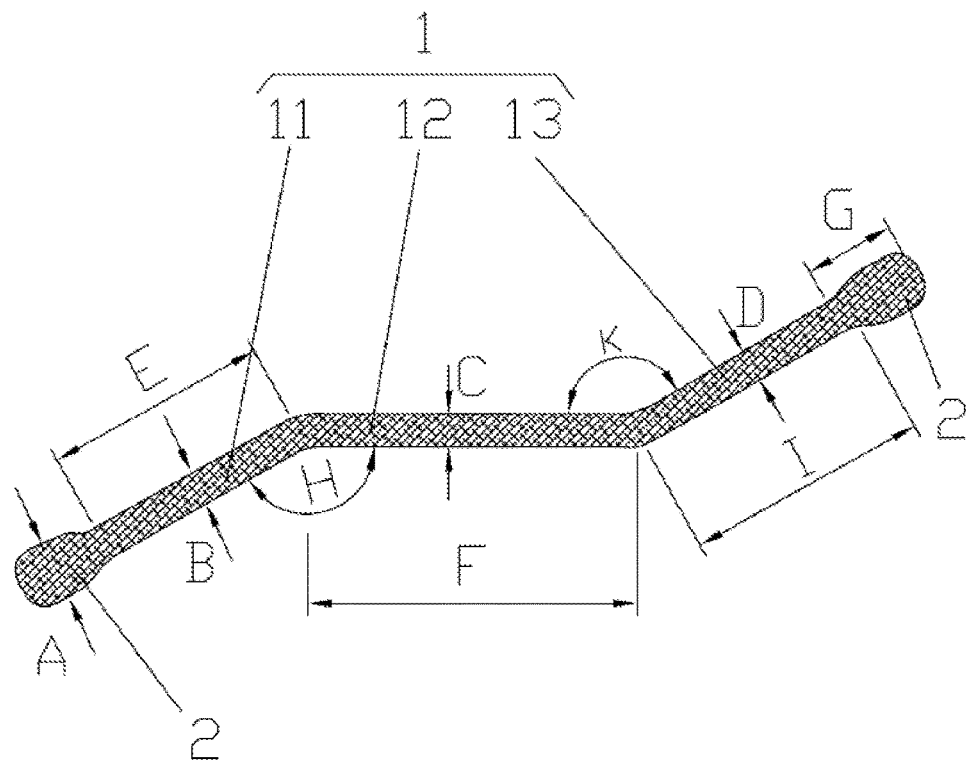
FIG. 1 is a schematic diagram for an orthographic projection of a metal bridge on a plane of a touch control structure according to an embodiment of the invention.

FIG. 1 is a schematic diagram for an orthographic projection of a metal bridge on a plane of a touch control structure according to an embodiment of the invention. As shown in FIG. 1, the metal bridge of the touch control structure includes a bridge body 1, and the bridge body has a shape of a zigzag line. That is, an orthographic projection of the bridge body 1 on a plane of the touch control structure has a shape of a zigzag line. By applying the bridge body 1 with a zigzag line shape, the metal bridge blocking the RGB display units can be avoided to the greatest extent. It is difficult for the human eye to observe the bridge body, and a desired shadow elimination effect is thus provided, thereby improving the display quality of the touch screen.

In the context of the disclosure, "the bridge body has a shape of a zigzag line" means that an orthographic projection of the bridge body on a plane of the touch control structure has a shape of a zigzag line. The plane of the touch control structure refers to a plane in which a plurality of touch sensing electrodes constituting the touch control structure are located. Moreover, the "length", "width" and "angle" of each part of the bridge indicate the length, width and angle of the parts corresponding to the orthographic projection.

In particular, in an embodiment, the orthographic projection of the bridge body 1 includes a first segment 11, a second segment 12 and a third segment 13, which are connected in series to form the zigzag line. An angle H between the first segment 11 and the second segment 12 is an obtuse angle. Optionally, a range for the angle H is 135°~165°. An angle K between the third segment 13 and the second segment 12 is an obtuse angle, and a range for the angle K is 135°~165°. Experiments show that the angle H and the angle K within the above range are favorable for shadow elimination. Further optionally, the angle H and the angle K are equal, so as to facilitate the process.

Optionally, a range for the width B of the first segment 11 is 5~11 µm, a range for the width C of the second segment 12 is 5~11 µm, and a range for the width D of the third segment 13 is 5~11 µm. By setting the width of each segment in the range, the disconnection due to a small width can be avoided, and the effect of shadow elimination will not be affected by a large width of the segment. Therefore, it is difficult for the human eye to observe the bridge body. Further optionally, the width of the first segment, the width of the second segment, and the width of the third segment (B, C and D) are equal, so as to facilitate the process.

In addition, a range for a length E of the first segment 11 is 70~90 µm, a range for a length F of the second segment 12 is 70~90 µm, and a range for a length I of the third segment 13 is 70~90 µm. Optionally, the length of the first segment, the length of the second segment, and the length of the third segment (E, F and I) are equal.

In an embodiment of the invention, the metal bridge further includes two bridge ends 2 located respectively at both ends of the bridge body 1. A width A of the bridge end 2 is greater than the width B of the first segment 11, the width C of the second segment 12 and the width D of the third segment 13. In this way, the connection area of the metal bridge and the conductive pattern (i.e., touch sensing electrode) can be increased so that a good electrical contact can be achieved. Optionally, the width A of the bridge end 2 is greater than 10 µm. With such an arrangement, after etching the metal bridge, the bridge end 2 is not formed as a tip end decreasing the antistatic ability, and the contact resistance of the bridge and the conductive pattern is also reduced. Of course, the width A should not be too large, otherwise the shadow elimination effect will be affected, resulting in observability for the human eye. In addition, in practical applications, the widths A of the two bridge ends 2 can be equal or unequal.

In addition, optionally, a range for a length G of the bridge end 2 is 15~30 µm. The bridge end 2 with the length within this range can increase the connection area of the metal bridge and the conductive pattern (i.e., touch sensing electrode), so that a good electrical contact can be achieved. In addition, in practical applications, the lengths G of the two bridge ends 2 can be equal or unequal.

It should be noted that the metal bridge of the touch control structure provided by the embodiment of the invention can be applied in products of On-cell, OGS, GFF and other touch control modes, and it also can also be applied in products with different sizes such as notebook and monitor.

It should also be noted that in practical applications, the metal bridge can be made of one or a combination of metal elements such as Mo, Al, Cu and Ag, alternatively, it can also be made of metal oxides such as ITO.

The following is a contrast test of the metal bridge provided with the embodiment and an existing metal bridge. The orthographic projection of the metal bridge on a plane of the touch control structure has a shape of a zigzag line, and the orthographic projection of the existing metal bridge on a plane of the touch control structure has a shape of a straight line.

In particular, the specific parameters of the metal bridge provided by the embodiment are as follows. The total length of the bridge is 262 µm. The rotation angle is 0°, i.e., the second segment 12 is arranged horizontally. The first segment 11 has a length of 80 µm in the horizontal direction. The widths of the three sections are equal, and the widths are all 11 µm. The width of the bridge end is 12-15 µm. The shadow elimination level for the 10.8 FHD LCM (i.e., liquid crystal module of 10.8 inch and 1920*1080 resolution) is Lev3. The shadow elimination level for the 13.3 FHD LCM (i.e., liquid crystal module of 13.3 inch and 1920*1080 resolution) is Lev3. The shadow elimination level for the 15.6 FHD LCM (i.e., liquid crystal module of 15.6 inch and 1920*1080 resolution) is Lev3. In the context of the present invention, "the second segment is arranged horizontally" means the second segment is parallel to the direction of the pixel row in the display module.

In contrast, there are eleven types of existing metal bridges. The specific parameters of the first metal bridge are as follows. The total length of the bridge is 250 µm. The rotation angle is 15°, i.e., the bridge body is tilted 15° relative to the horizontal line (i.e., the direction of the pixel row in the display module), and the left end is lower than the right end. The shadow elimination level for the 10.8 FHD LCM is Lev3.5. The shadow elimination level for the 13.3 FHD LCM is Lev4. The shadow elimination level for the 15.6 FHD LCM is Lev1.5.

The specific parameters of the second metal bridge are as follows. The total length of the bridge is 250 µm. The rotation angle is 30°, i.e., the bridge body is tilted 30° relative to the horizontal line (i.e., the direction of the pixel row in the display module), and the left end is lower than the right end. The shadow elimination level for the 10.8 FHD LCM is Lev3. The shadow elimination level for the 13.3 FHD LCM is Lev3. The shadow elimination level for the 15.6 FHD LCM is Lev1.5.

The specific parameters of the third metal bridge are as follows. The total length of the bridge is 250 µm. The rotation angle is 45°, i.e., the bridge body is tilted 45° relative to the horizontal line (i.e., the direction of the pixel row in the display module), and the left end is lower than the right end. The shadow elimination level for the 10.8 FHD LCM is Lev4. The shadow elimination level for the 13.3 FHD LCM is Lev4. The shadow elimination level for the 15.6 FHD LCM is Lev2.

The specific parameters of the fourth metal bridge are as follows. The total length of the bridge is 262 µm. The rotation angle is 0°, i.e., the bridge body is tilted 0° relative to the horizontal line (i.e., the direction of the pixel row in the display module). The shadow elimination level for the 10.8 FHD LCM is Lev4. The shadow elimination level for the 13.3 FHD LCM is Lev4.5. The shadow elimination level for the 15.6 FHD LCM is Lev2.5.

The specific parameters of the fifth metal bridge are as follows. The total length of the bridge is 262 µm. The rotation angle is 15°, i.e., the bridge body is tilted 15° relative to the horizontal line (i.e., the direction of the pixel row in the display module). The shadow elimination level for the 10.8 FHD LCM is Lev4.5. The shadow elimination level for the 13.3 FHD LCM is Lev5. The shadow elimination level for the 15.6 FHD LCM is Lev2.5.

The specific parameters of the sixth metal bridge are as follows. The total length of the bridge is 262 μm. The rotation angle is 30°, i.e., the bridge body is tilted 30° relative to the horizontal line (i.e., the direction of the pixel row in the display module). The shadow elimination level for the 10.8 FHD LCM is Lev4.5. The shadow elimination level for the 13.3 FHD LCM is Lev3.5. The shadow elimination level for the 15.6 FHD LCM is Lev2.5.

The specific parameters of the seventh metal bridge are as follows. The total length of the bridge is 262 μm. The rotation angle is 45°, i.e., the bridge body is tilted 45° relative to the horizontal line (i.e., the direction of the pixel row in the display module). The shadow elimination level for the 10.8 FHD LCM is Lev4.5. The shadow elimination level for the 13.3 FHD LCM is Lev4. The shadow elimination level for the 15.6 FHD LCM is Lev3.

The specific parameters of the eighth metal bridge are as follows. The total length of the bridge is 262 μm. The rotation angle is 0°, i.e., the bridge body is tilted 0° relative to the horizontal line (i.e., the direction of the pixel row in the display module). The shadow elimination level for the 10.8 FHD LCM is Lev4.5. The shadow elimination level for the 13.3 FHD LCM is Lev4. The shadow elimination level for the 15.6 FHD LCM is Lev2.5.

The specific parameters of the ninth metal bridge are as follows. The total length of the bridge is 262 μm. The rotation angle is 15°, i.e., the bridge body is tilted 15° relative to the horizontal line (i.e., the direction of the pixel row in the display module). The shadow elimination level for the 10.8 FHD LCM is Lev4.5. The shadow elimination level for the 13.3 FHD LCM is Lev4. The shadow elimination level for the 15.6 FHD LCM is Lev2.5.

The specific parameters of the tenth metal bridge are as follows. The total length of the bridge is 262 μm. The rotation angle is 30°, i.e., the bridge body is tilted 30° relative to the horizontal line (i.e., the direction of the pixel row in the display module). The shadow elimination level for the 10.8 FHD LCM is Lev4.5. The shadow elimination level for the 13.3 FHD LCM is Lev4. The shadow elimination level for the 15.6 FHD LCM is Lev2.5.

The specific parameters of the eleventh metal bridge are as follows. The total length of the bridge is 262 μm. The rotation angle is 45°, i.e., the bridge body is tilted 45° relative to the horizontal line (i.e., the direction of the pixel row in the display module). The shadow elimination level for the 10.8 FHD LCM is Lev4.5. The shadow elimination level for the 13.3 FHD LCM is Lev4. The shadow elimination level for the 15.6 FHD LCM is Lev2.5.

It should be noted that the criterion for shadow elimination is: if the shadow elimination level is Lev1, the bridge is invisible; if the shadow elimination level is Lev2, the bridge is looming; if the shadow elimination level is Lev3, the bridge is less obvious; if the shadow elimination level is Lev4, the bridge is visible; if the shadow elimination level is Lev5, the bridge is clearly visible.

Through the contrast test, it shows that the shadow elimination effect of the metal bridge provided by the embodiment of the invention is the best. In particular, for the metal bridge provided by the embodiment of the invention, the shadow elimination level for 10.8 & 13.3 FHD LCM is Lev3, the shadow elimination level for 15.6 FHD LCM is Lev1, the shadow elimination effect of the embodiment is better than the shadow elimination effect of any one in the 11 types of existing metal bridges.

In another technical solution, an embodiment of the invention provides a touch screen including a display panel and a touch control structure. The touch control structure includes the metal bridge according to any one of the above mentioned embodiments. The touch control structure includes touch electrodes (usually made of ITO material) respectively arranged transversely and longitudinally, and the touch electrodes are arranged to form a conductive pattern. Since two adjacent touch electrodes are not connected in the intersection region, a metal bridge is required for the connection. The metal bridge is insulated from other two touch electrodes intersecting with these two adjacent touch electrodes.

Figure 2:
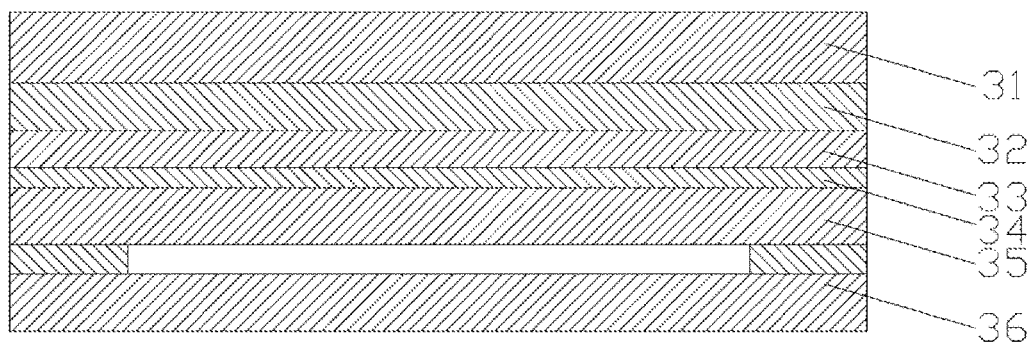
FIG. 2 is a cross-section view of an On-cell touch screen.
Figure 3:
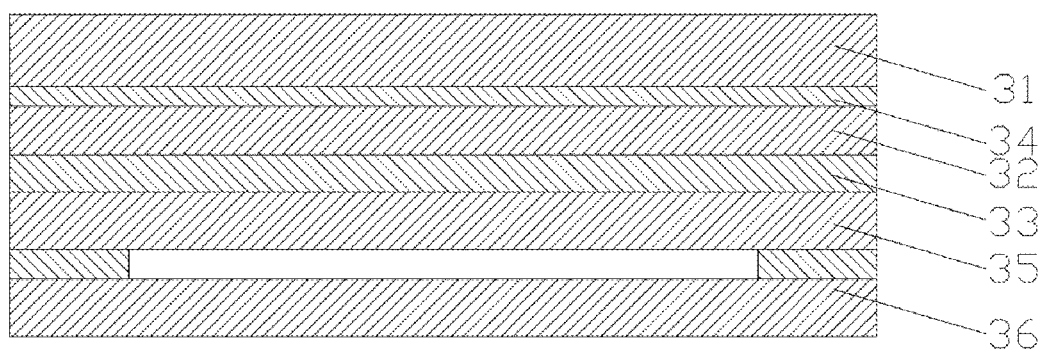
FIG. 3 is a cross-section view of an OGS touch screen.

The above mentioned touch control structure can be applied in an On-cell touch screen and an OGS touch screen. In particular, FIG. 2 is a cross-section view of an On-cell touch screen. Referring to FIG. 2, the On-cell touch screen includes a glass substrates 31, an OCR (optical clear resin) layer 32, a polarizer 33, a sensing layer 34, a color film substrate 35 and an array substrate 36 arranged in sequence from top to bottom. FIG. 3 is a cross-section view of an OGS touch screen. Referring to FIG. 3, the OGS touch screen includes a glass substrates 31, a sensing layer 34, an OCR layer 32, a polarizer 33, a color film substrate 35 and an array substrate 36 arranged in sequence from top to bottom.

From the above it can be seen that though the location of the sensing layer 34 (i.e., touch control structure) in the On-cell touch screen is different from that in the OGS touch screen, the methods for manufacturing the metal bridges in the sensing layers 34 can be the same. Moreover, the metal bridge of the touch control structure provided by the embodiment of the invention is compatible with the On-cell touch screen and the OGS touch screen.

Another embodiment of the present invention provides an electronic equipment. The electronic equipment includes the touch screen recited in the above mentioned embodiments.

In the touch screen provided by the embodiment of the invention, the above mentioned metal bridge is applied. A desired shadow elimination effect is thus provided, thereby improving the display quality of the touch screen.

The above embodiments are only used for explanations rather than limitations to the present invention, the ordinary skilled person in the related technical field, in the case of not departing from the spirit and scope of the present invention, may also make various modifications and variations. The person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A metal bridge of a touch control structure comprising a bridge body;
   wherein an orthographic projection of the bridge body on a plane of the touch control structure has a shape of a zigzag line; the orthographic projection of the bridge body comprises a first segment, a second segment and a third segment, which are connected in series to form the zigzag line;
   and wherein a range for an angle between the first segment and the second segment is 135°~165°; a range for an angle between the third segment and the second segment is 135°~165°.

2. The metal bridge of the touch control structure according to claim 1, wherein the angle between the first segment and the second segment is equal to the angle between the third segment and the second segment.

3. A touch screen comprising a display panel and a touch control structure; wherein the touch control structure comprises the metal bridge according to claim 1.

4. An electronic equipment comprising the touch screen according to claim 3.

5. The metal bridge of the touch control structure according to claim 1, further comprising two bridge ends located respectively at both ends of the bridge body;

and wherein a width of the bridge end is greater than a width of the first segment, a width of the second segment and a width of the third segment.

6. The metal bridge of the touch control structure according to claim 5, wherein the width of the bridge end is greater than 10 μm.

7. The metal bridge of the touch control structure according to claim 6, wherein a range for a length of the bridge end is 15~30 μm.

8. A metal bridge of a touch control structure comprising a bridge body;

wherein an orthographic projection of the bridge body on a plane of the touch control structure has a shape of a zigzag line; the orthographic projection of the bridge body comprises a first segment, a second segment and a third segment, which are connected in series to form the zigzag line; an angle between the first segment and the second segment is an obtuse angle; an angle between the third segment and the second segment is an obtuse angle;

and wherein a range for the width of the first segment is 5~11 μm; a range for the width of the second segment is 5~11 μm; a range for the width of the third segment is 5~11 μm.

9. The metal bridge of the touch control structure according to claim 8, wherein the width of the first segment, the width of the second segment, and the width of the third segment are equal.

10. The metal bridge of the touch control structure according to claim 8, further comprising two bridge ends located respectively at both ends of the bridge body;

and wherein a width of the bridge end is greater than a width of the first segment, a width of the second segment and a width of the third segment.

11. The metal bridge of the touch control structure according to claim 10, wherein the width of the bridge end is greater than 10 μm.

12. The metal bridge of the touch control structure according to claim 11, wherein a range for a length of the bridge end is 5~30 μm.

13. A touch screen comprising a display panel and a touch control structure; wherein the touch control structure comprises the metal bridge according to claim 8.

14. An electronic equipment comprising the touch screen according to claim 13.

15. A metal bridge of a touch control structure comprising a bridge body;

wherein an orthographic projection of the bridge body on a plane of the touch control structure has a shape of a zigzag line; the orthographic projection of the bridge body comprises a first segment, a second segment and a third segment, which are connected in series to form the zigzag line; an angle between the first segment and the second segment is an obtuse angle; an angle between the third segment and the second segment is an obtuse angle;

and wherein a range for a length of the first segment is 70~90 μm; a range for a length of the second segment is 70~90 μm; a range for a length of the third segment is 70~90 μm.

16. The metal bridge of the touch control structure according to claim 15, wherein the length of the first segment, the length of the second segment, and the length of the third segment are equal.

17. The metal bridge of the touch control structure according to claim 15, further comprising two bridge ends located respectively at both ends of the bridge body;

and wherein a width of the bridge end is greater than a width of the first segment, a width of the second segment and a width of the third segment.

18. The metal bridge of the touch control structure according to claim 17, wherein the width of the bridge end is greater than 10 μm.

19. The metal bridge of the touch control structure according to claim 18, wherein a range for a length of the bridge end is 15~30 μm.

20. A touch screen comprising a display panel and a touch control structure; wherein the touch control structure comprises the metal bridge according to claim 15.

* * * * *